United States Patent
Hastert et al.

(10) Patent No.: US 6,711,451 B2
(45) Date of Patent: Mar. 23, 2004

(54) POWER MANAGEMENT IN SELECTIVE DEPOSITION MODELING

(75) Inventors: Mark Hastert, Simi Valley, CA (US); Arvind Chari, West Hills, CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 10/191,033

(22) Filed: Jul. 2, 2002

(65) Prior Publication Data

US 2004/0006438 A1 Jan. 8, 2004

(51) Int. Cl.[7] .............................................. G06F 19/00
(52) U.S. Cl. ........................ 700/119; 713/300; 700/295
(58) Field of Search ........................ 700/117–120, 295, 700/297–298; 713/300, 324, 330, 340

(56) References Cited

U.S. PATENT DOCUMENTS

| | | |
|---|---|---|
| 5,136,515 A | 8/1992 | Helinski |
| 5,204,055 A | 4/1993 | Sachs et al. |
| 5,216,616 A | 6/1993 | Masters |
| 5,340,433 A | 8/1994 | Crump |
| 5,483,656 A * | 1/1996 | Oprescu et al. ............. 713/320 |
| 5,555,176 A | 9/1996 | Menhennett et al. |
| 5,752,046 A * | 5/1998 | Oprescu et al. ............. 713/300 |
| 5,801,961 A * | 9/1998 | Moore et al. ................ 700/286 |
| 5,855,836 A | 1/1999 | Leyden et al. |
| 5,866,058 A | 2/1999 | Batchelder et al. |
| 6,133,355 A | 10/2000 | Leyden et al. |
| 6,259,962 B1 | 7/2001 | Gothait |
| 6,301,527 B1 * | 10/2001 | Butland et al. ............. 700/286 |
| 6,301,674 B1 * | 10/2001 | Saito et al. ................. 713/340 |
| 2003/0158609 A1 * | 8/2003 | Chiu ............................ 700/22 |

FOREIGN PATENT DOCUMENTS

| | | |
|---|---|---|
| WO | WO 97/11837 A1 | 4/1997 |
| WO | WO 00/11092 A1 | 3/2000 |
| WO | WO 01/26023 A1 | 4/2001 |
| WO | WO 01/68375 | 9/2001 |

OTHER PUBLICATIONS

U.S. patent application Publication 2002/0016386 A1, published Feb. 7, 2002 by Napadensky.

U.S. patent application S/N 10/140,426, filed May 7, 2002, Docket No. USA.314, "Flash Curing in Selective Deposition Modeling."

* cited by examiner

*Primary Examiner*—Leo Picard
*Assistant Examiner*—Zoila Cabrera
(74) *Attorney, Agent, or Firm*—Ralph D'Alessandro; James E. Curry

(57) ABSTRACT

A power management system for a selective deposition modeling apparatus for maintaining the power consumption of the apparatus within the limits of conventional power available in most all office environments. The apparatus has a plurality of power drawing components, each component having a activation power rating wherein the accumulative total of all the power ratings exceeds a baseline power consumption value for the apparatus. The system prevents a baseline power consumption value from being exceeded by determining which components can be activated while leaving others inactivated.

11 Claims, 4 Drawing Sheets

POWER MANAGEMENT IN SELECTIVE DEPOSITION MODELING

BACKGROUND OF THE INVENTION

1. Field of the Invention

The invention relates in general to solid deposition modeling, and in particular to a method and managing power consumption in a selective deposition modeling apparatus so as to make the apparatus viable in an office environment.

2. Description of the Prior Art

Recently, several new technologies have been developed for the rapid creation of models, prototypes, and parts for limited run manufacturing. These new technologies are generally called Solid Freeform Fabrication techniques, and are herein referred to as "SFF." Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to conventional fabrication techniques, which are generally subtractive in nature.

In most SFF techniques, structures are formed in a layer by layer manner by solidifying or curing successive layers of a build material. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM," a build material is typically jetted or dropped in discrete droplets, or extruded through a nozzle, in order to solidify on contact with a build platform or previous layer of solidified material in order to build up a three-dimensional object in a layerwise fashion. Other synonymous names for SDM which are used in this industry are solid object imaging, solid object modeling, fused deposition modeling, selective phase area deposition, multi-phase jet modeling, three-dimensional printing, thermal stereolithography, selective phase area deposition, ballistic particle manufacturing, fused deposition modeling, and the like. Ballistic particle manufacturing is disclosed in, for example, U.S. Pat. No. 5,216,616 to Masters. Fused deposition modeling is disclosed in, for example, U.S. Pat. No. 5,340,433 to Crump. Three-dimensional printing is disclosed in, for example, U.S. Pat. No. 5,204,055 to Sachs et al. Often a thermoplastic material having a low-melting point is used as the solid modeling material in SDM, which is delivered through a jetting system such as an extruder or print head. One type of SDM process which extrudes a thermoplastic material is described in, for example, U.S. Pat. No. 5,866,058 to Batchelder et al. One type of SDM process utilizing ink jet print heads is described in, for example, U.S. Pat. No. 5,555,176 to Menhennett et al.

Recently, there has developed an interest in utilizing curable materials in SDM. One of the first suggestions of using a radiation curable build material in SDM is found in U.S. Pat. No. 5,136,515 to Helinski, wherein it is proposed to selectively dispense a UV curable build material in an SDM system. Some of the first UV curable material formulations proposed for use in SDM systems are found in Appendix A of International Patent Publication No. WO 97/11837, where three reactive material compositions are provided. More recent teachings of using curable materials in various selective deposition modeling systems are provided in U.S. Pat. No. 6,259,962 to Gothait; U.S. Pat. Nos. 6,133,355 and 5,855,836 to Leyden et al; U.S. Pat. App. Pub. No. U.S. 2002/0016386 A1; and International Publication Numbers WO 01/26023, WO 00/11092, and WO 01/68375.

For SDM systems that selectively dispense curable materials, a radiation curing step is needed to initiate the curing process. Radiation curing exposure systems whether they are curing.

One of the advantages of first generation SDM machines that worked with thermoplastic waxes to build objects was that the machines could be used in an office environment. These wax dispensing SDM systems consumed not much more power than other office equipment such as photocopier, and could therefore operate on conventional power requirements found in an office, such as 20A/115V service.

However, SDM systems dispensing curable materials require a radiation curing exposure system in order to initiate the curing process. These systems, typically flash curing or continuous flood systems, consume a significant amount of power when they are activated, such that when combined with the power consumed by other systems within the SDM apparatus, the overall power consumed by the apparatus exceeds conventional power limits found in an office. Thus, power consumption must be kept at a minimum so as to meet conventional power limitations as well as a power management system to assure these limitations are not exceeded.

Thus, there is a need to develop a power management system for use in an SDM apparatus capable of maintaining the average power consumption of the machine within the acceptable limits of an office environment. These and other difficulties of the prior art have been overcome according to the present invention.

BRIEF SUMMARY OF THE INVENTION

The present invention provides its benefits across a broad spectrum. While the description which follows hereinafter is meant to be representative of a number of such applications, it is not exhaustive. As will be understood, the basic methods and apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a power management system for an SDM apparatus that adapts the apparatus for use in any office environment.

It is another aspect of the present invention to provide a power management system that prevents the SDM apparatus for exceeding a baseline power consumption value when in operation in any office environment.

It is a feature of the present invention that a hierarchical list is generated of the power drawing components that need to be activated, in which only those that can be activated without exceeding the baseline power consumption value are activated.

It is another feature of the present invention that when one high power drawing component is activated all other power drawing components are de-activated.

It is an advantage of the present invention that an SDM apparatus can be utilized in all office environments without the need of a transformer or other power storing devices.

These and other aspects, features, and advantages are achieved/attained in the method and apparatus of the present invention. The present invention method of power management for a selective deposition modeling apparatus comprises: measuring a divergence from a desired effect to be achieved in the apparatus for each power drawing component, determining which components need to be activated based on a comparison of the measured divergence and an acceptable threshold effect for each component, sorting the components that need to be activated into a list, determining from the list the number of power consuming components that can be activated without exceeding the baseline power consumption value; and activating the components. Once a steady state condition for the apparatus is achieved, one of the power drawing components which draws a substantial amount of power when activated is activated while all other components are de-activated so that the baseline power consumption value is not exceeded.

The selective deposition modeling apparatus for forming a three-dimensional object comprises a support means affixed to the apparatus for supporting the three-dimensional object in the build environment; a dispensing means affixed to the apparatus and in communication with the support means for dispensing the curable material in the build environment according to the computer data to form the layers of the three-dimensional object; a flash exposure means affixed to the apparatus for curing the dispensed material, the flash exposure means in communication with the support means; a plurality of power drawing components, each component having an activation power rating wherein the accumulative total of all the power ratings exceeds a baseline power consumption value of the apparatus; and a power management system. The power management system maintains the amount of power consumed by the plurality of power drawing components below a baseline power consumption value. Further, the power management system adapted to: measure the divergence from a desired effect to be achieved in the apparatus by each component, determine which components need to be activated based on a comparison of the measured divergence and an acceptable threshold effect for each component, sort the components that need to be activated into a list; determine from the list the number of power consuming components that can be activated without exceeding the baseline power consumption value, and activate the components.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

DETAILED DESCRIPTION OF THE PREFERRED EMBODIMENTS

Figure 1:
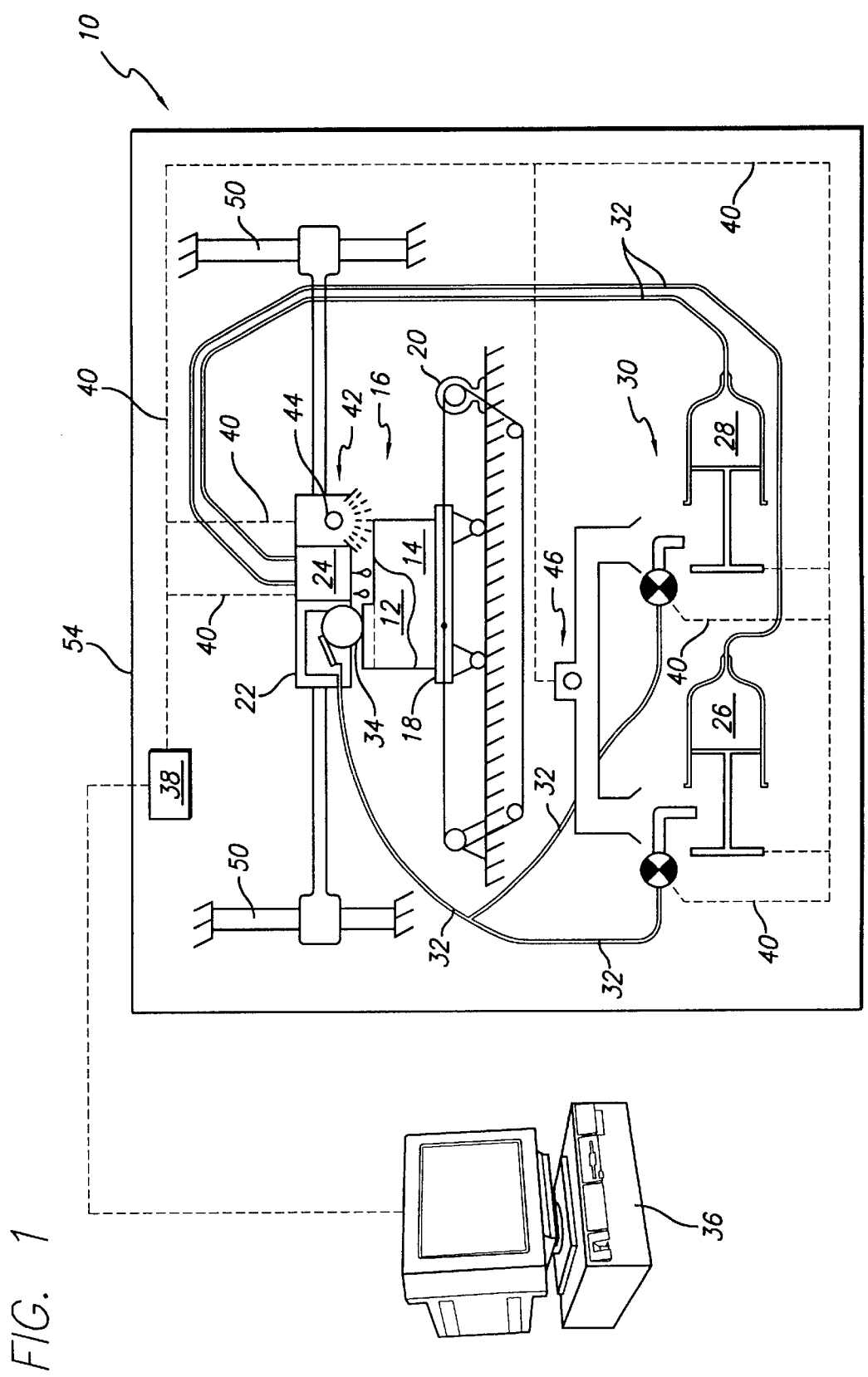
FIG. 1 is a diagrammatic side view of a solid deposition modeling apparatus incorporating the present invention power management system in which the internal components of the apparatus are shown.

While the power management techniques of the present invention are applicable to all SFF techniques, the invention will be described with respect to an SDM apparatus utilizing an ink jet print head dispensing an ultraviolet radiation curable phase change material. However, it is to be appreciated that the power management techniques of the present invention can be adapted for use with any SFF apparatus to lower power consumption in order to make the apparatus acceptable for use in an office environment.

As used herein, the term "a flowable state" of a build material is a state wherein the material is unable to resist shear stresses that are induced by a dispensing device, such as those induced by an ink jet print head when dispensing the material, causing the material to move or flow. Preferably, the flowable state of the build material is a liquid state, however, the flowable state of the build material may also exhibit thixotropic-like properties. The term "solidified" and "solidifiable" as used herein refer to the phase change characteristics of a material where the material transitions from the flowable state to a non-flowable state. A "non-flowable state" of a build material is a state wherein the material is sufficiently self-supportive under its own weight so as to hold its own shape. A build material existing in a solid state, a gel state, or paste state, are examples of a non-flowable state of a build material for the purposes herein. In addition, the term "cured" or "curable" refers to any polymerization reaction. Preferably, the polymerization reaction is triggered by controlled exposure to actinic radiation or thermal heat. Most preferably, the polymerization reaction involves the cross-linking of monomers and oligomers initiated by exposure to actinic radiation in the ultraviolet wavelength band. Further, the term "cured state" refers to a material, or portion of a material, in which the polymerization reaction has substantially completed. It is to be appreciated that as a general matter the material can easily transition between the flowable and non-flowable state prior to being cured; however, once cured, the material cannot transition back to a flowable state and be dispensed by the apparatus The SDM apparatus incorporating the present invention power management system dispenses a curable phase change material from a Z850 piezoelectric ink jet print head available from Xerox Corporation of Wilsonville, Oreg., although other dispensing devices could be used, if desired. The material dispensed from the Z850 print head desirably has a viscosity of between about 13 to about 14 centipoise at a dispensing temperature of about 80° C. The dispensing methodology of this system is described in greater detail in U.S. patent application Ser. No. 09/971,337, and the build and support material formulations are described in greater detail in U.S. patent application Ser. No. 09/971,247, both applications assigned to the assignee of the present invention.

Referring particularly to FIG. 1 there is illustrated generally by the numeral 10 an SDM apparatus incorporating the present invention power management system. The SDM apparatus is shown building a three-dimensional object 12 on a support structure 14 in a build environment shown generally by the numeral 16. The object 12 and support structure 14 are built in a layer by layer manner on a build platform 18 that is reciprocally driven back and forth by a conventional actuation means 20. Directly above and parallel to the platform 18 is a material dispensing trolley 22 carrying a dispensing device 24. Preferably, the dispensing device 24 is the Z850 piezoelectric ink jet print head discussed previously. Alternatively an acoustic or electrostatic print head could be used as well as a thermal spray nozzle, if desired.

The dispensing device 24 is fed the curable phase change build material 26 and the phase change support material 28 from a material feed and waste system, generally identified by numeral 30. Umbilicals of the material feed and waste system 30 are provided with heaters (not shown) to bring and maintain the materials in a flowable state. The material feed and waste system 30 is described in greater detail in U.S. patent application Ser. No. 09/970,956 assigned to the assignee of the present invention. Generally a plurality of heaters within the apparatus 10 are provided to initially heat the materials to the flowable state, and to maintain the materials in the flowable state along its path to the print head. These heaters draw a significant portion of the electric power consumed by the SDM apparatus 10, which are controlled and regulated by the present invention power management system.

A heated planarizer 34 is drawn across the dispensed layers to smooth the layers and normalize the layer to establish the final layer thickness. The planarizer 34 is used to normalize the layers as needed in order to eliminate the accumulated effects of drop volume variation, thermal distortion, and the like, which occur during the build process. The heated planarizer 34 also draws electric power consumed by the SDM apparatus and is also controlled and regulated by the present invention power management system.

Shown in FIG. 1, is an external computer 36 that generates or is provided with a solid modeling CAD data file containing three-dimensional coordinate data of an object to be formed. Typically the computer 36 converts the data of the object into surface representation data, most commonly into the STL file format and also establishes support region data for the object. When a user desires to build an object, a print command is executed at the external computer in which the STL file is processed, through print client software, and sent to the computer controller 38 of the SDM apparatus 10 as a print job. The computer controller 38 processes the data and executes the signals that operate the apparatus to form the object. The data transmission route and controls of the various components of the SDM apparatus are represented as dashed lines at 40.

A flash exposure system, generally identified by numeral 42 is mounted on the dispensing trolley 22 which is used to expose the dispensed build material to initiate curing of the build material. The flash exposure system 42 includes flash lamp 44, which is used to provide a planar (flood) exposure of UV radiation to each layer as needed. The planar flash generated by the flash exposure system draws a significant amount of electric power from the SDM apparatus during the brief period in which the flash is activated. It is believed that approximately about 9 amps of current is drawn from the SDM apparatus 10 during the flash which is dealt with by the present invention power management system, which is a high power drawing component of the system. The flash exposure system 42 is discussed in greater detail in U.S. patent application Ser. No. 10/140,426. A waste flash exposure system generally identified by numeral 46 is also used to cure the waste material, which draws approximately less current than the main flash exposure system 42.

Figure 2:
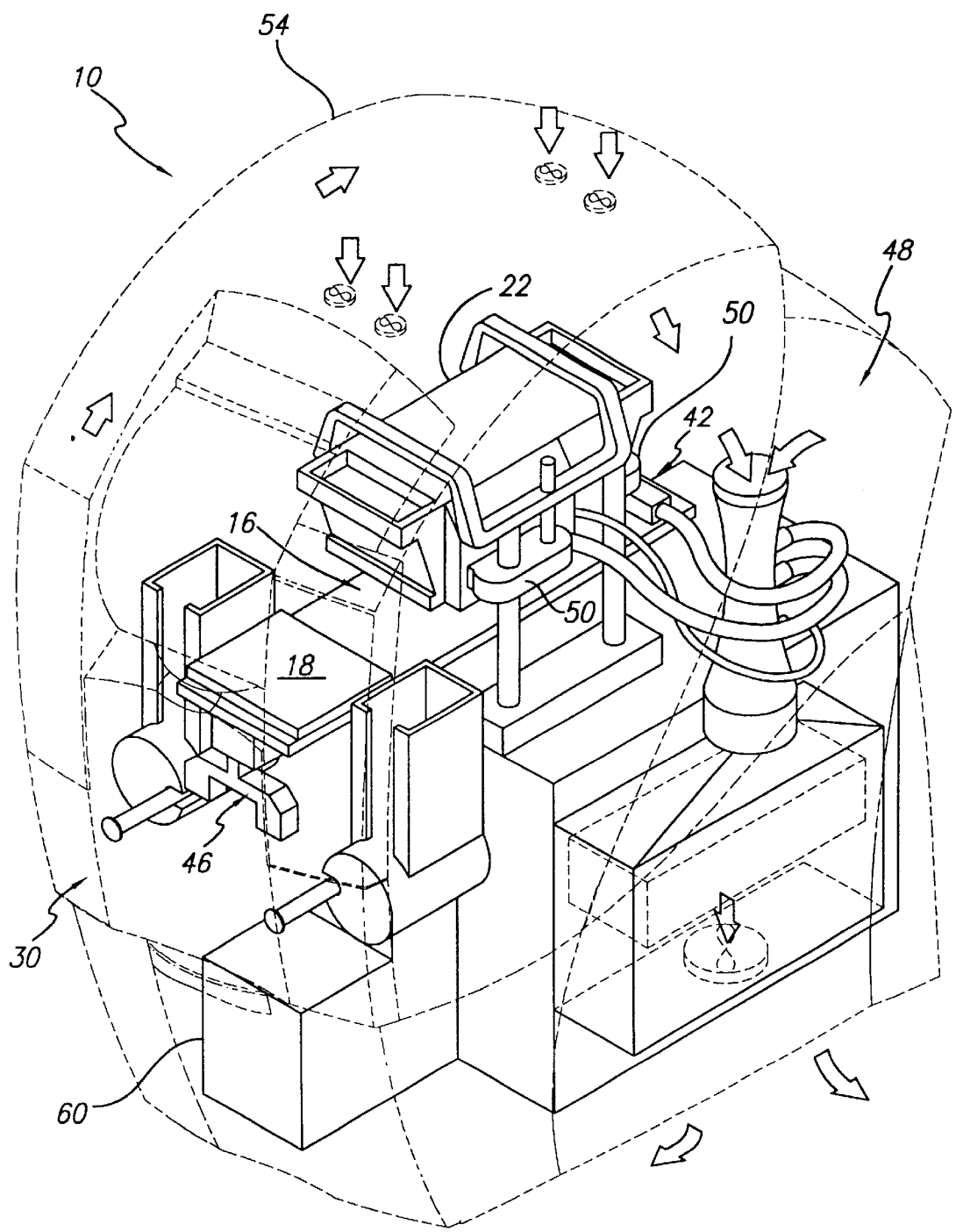
FIG. 2 is a partially transparent isometric view of the apparatus of FIG. 1 showing the internal components of the apparatus.

A ventilation and cooling system (not shown in FIG. 1) is also incorporated into the SDM apparatus 10. The ventilation and cooling system, generally identified by numeral 48 in FIG. 2, is described in greater detail in U.S. Patent Application filed on Jun. 24, 2002 under Ser. No. 10/180,380 entitled "Ventilation and Cooling in Selective Deposition Modeling" and assigned to the assignee of the present invention. The ventilation and cooling system 48 also works to enable the SDM apparatus 10 to be operated in an office environment by preventing odor vapors arising from the build and support material from being dispersed into the air.

In the SDM apparatus 10 in FIG. 1, the dispensing trolley 22 is precisely moved by actuation means 50 vertically to control the thickness of the layers of the object. Preferably, the actuation means 50 comprises precision lead screw linear actuators driven by servomotors. The ends of the linear actuators reside on opposite ends of the build environment 16 and in a transverse direction to the direction of reciprocation of the build platform, which can be seen in FIG. 3. However, for ease of illustration in FIG. 1 they are shown in a two-dimensionally flat manner.

Figure 3:
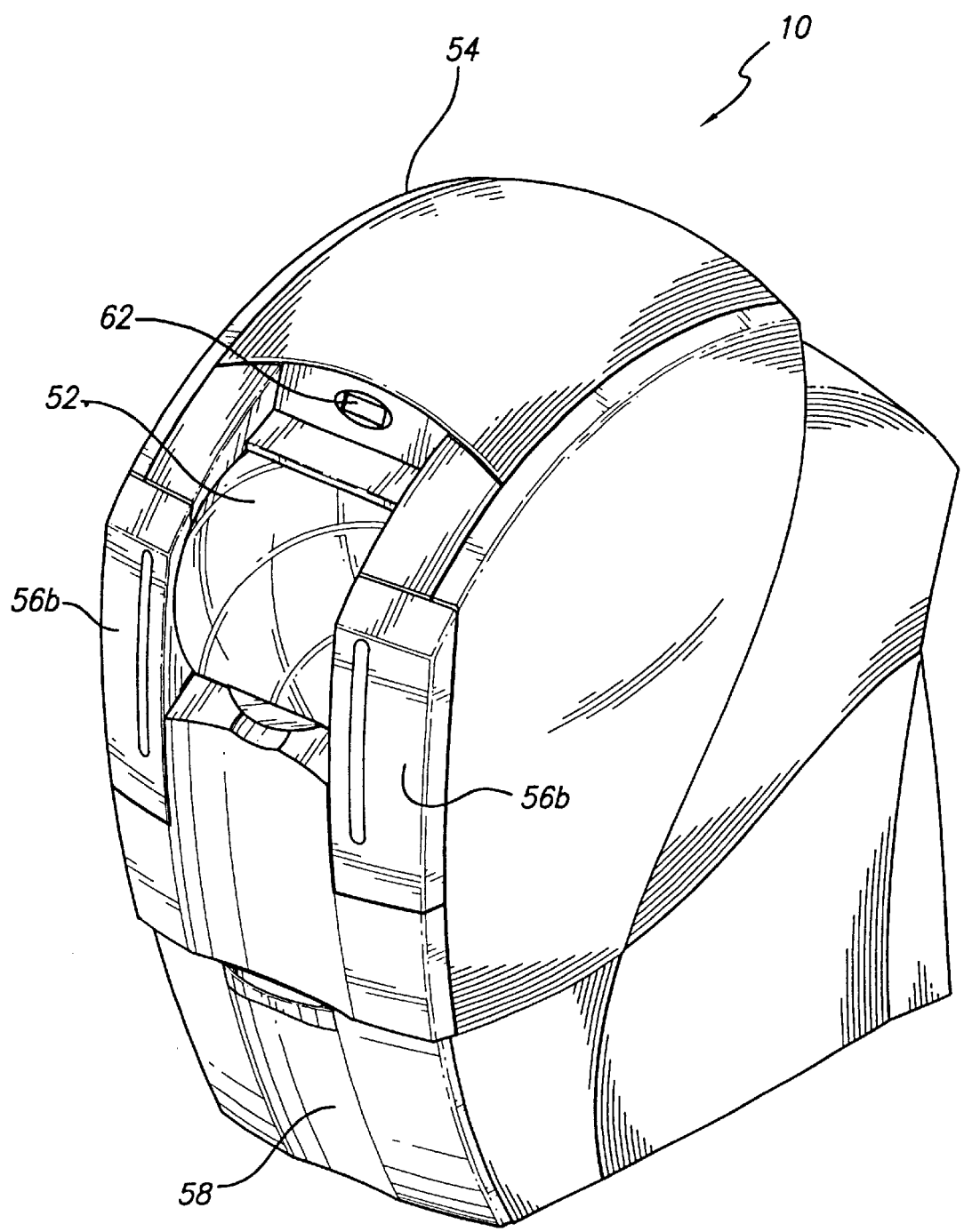
FIG. 3 is an isometric view of the apparatus of FIG. 1.

Referring to FIG. 3, a front isometric view of the SDM apparatus 10 is shown. To access the build environment, a slideable door 52 is provided at the front of the apparatus on the containment chamber or housing assembly 54. The door 52 does not allow radiation within the machine to escape into the environment. The apparatus is configured such that it will not operate or turn on with the door 52 open. In addition, when the apparatus is in operation, the door 52 will not open. Material feed doors 56a and 56b are provided so that the curable phase change material cartridges can be inserted into the apparatus through one door 56a and the non-curable phase change material cartridges can be inserted into the apparatus through the other door 56b. A waste drawer 64 is provided at the bottom end of the SDM apparatus 10 so that the expelled cartridges in the waste bin 60 can be removed from the apparatus. A user interface 62 is provided which is in communication with the external computer previously discussed which tracks receipt of the print command data from the external computer (not shown).

The SDM apparatus 10 comprises a number of power drawing components. These power drawing components include heaters, power supplies, motion actuators, and the flash exposure system discussed previously. Generally, all the power drawing components cannot be activated simultaneously without causing the apparatus to draw more power than is typically available in most office environments. In some Asian countries about 100V AC (alternating current voltage) drawing about 12.5 A (amperes) is available. In the United States generally about 115V AC drawing about 15 A is typically available, and in Europe generally about 230V AC at about 15 A is available. In order to make the SDM apparatus functional in all three of these regions, cyclic stealing is implemented on the line voltage delivered to each component so that each component receives a standard average apparent power (herein "VA" for Volt Amperes). The cyclic stealing can be accomplished for any line voltage measured between about 90V AC to about 264V AC and is accomplished by software and hardware implementation that is well known in the art.

Because 100V AC is the lowest available line voltage typically available, the baseline power consumption value for the SDM apparatus was selected to be about 1250 VA at a nominal voltage of about 100V RMS (root-mean-square voltage). Thus, the cyclic stealing makes available to the power drawing components about 100 V RMS regardless of the actual line voltage being supplied. However, the cyclic stealing is staggered for each component so that a uniform power draw by the SDM apparatus is maintained thereby minimizing flickering affects that otherwise would be imposed on other electric devices connected to the same input power circuit.

Since most all of the components are constant resistance electric heaters, each of these components thus receives a standard average apparent power (VA) when activated regardless of the line voltage. Referring to Table 1, a list of the power drawing components of the SDM apparatus that are controlled by the present invention power management system are shown.

TABLE 1

| Power Drawing Component | Threshold Effect | Average Apparent Power |
|---|---|---|
| Printhead Heaters | 75° C. | 157.5 VA |
| Printhead Adapter Heater | 78° C. | 43.4 VA |
| Printhead Nozzle Plate Heater | 80° C. | 31.4 VA |
| Planarizer Heater | 80° C. | 31.4 VA |
| Feed & Waste Heater #1 | 68° C. | 69.4 VA |
| Feed & Waste Heater #2 | 60° C. | 104 VA |
| Cartridge Pre-Heater #1 | 75° C. | 156.25 VA |
| Cartridge Pre-Heater #2 | 70° C. | 156.25 VA |
| Feed & Waste Drum Heater #1 | 70° C. | 52 VA |
| Feed & Waste Drum Heater #1 | 70° C. | 52 VA |
| Feed Block Heater #1 | 78° C. | 43.4 VA |
| Feed Block Heater #2 | 75° C. | 43.4 VA |
| Feed Umbilical Heater #1 | 87° C. | 74 VA |
| Feed Umbilical Heater#2 | 72° C. | 49.3 VA |
| Waste Umbilical Heater #1 | 75° C. | 49.3 VA |
| Waste Umbilical Heater #2 | 75° C. | 49.3 VA |
| Printhead Squeegee Heater | 80° C. | 104 VA |
| Flash Exposure System | (activated when needed to) cure layers) | 600 VA |

The threshold effect is the minimum temperature of the areas of the SDM apparatus in which these heaters are attached that is required in order for the apparatus to be able to print the layers of three-dimensional objects. The average apparent power is the activation power rating of each component when it is activated. For these components the accumulative total of all the power ratings is 1266 VA, which, since these components are constant resistive loads is 1266 Watts of power. As noted previously, the baseline power consumption value selected for the SDM apparatus is 1250 VA. Thus all of the components cannot be activated simultaneously without exceeding the baseline power consumption value. This is particularly so in conjunction with the flash exposure system which, when activated draws approximately about 600 VA or Watts which is a substantial amount of the available power. The present invention power management system controls all of these components so as to maintain the power consumption of the SDM apparatus below the baseline power consumption value.

Figure 4:
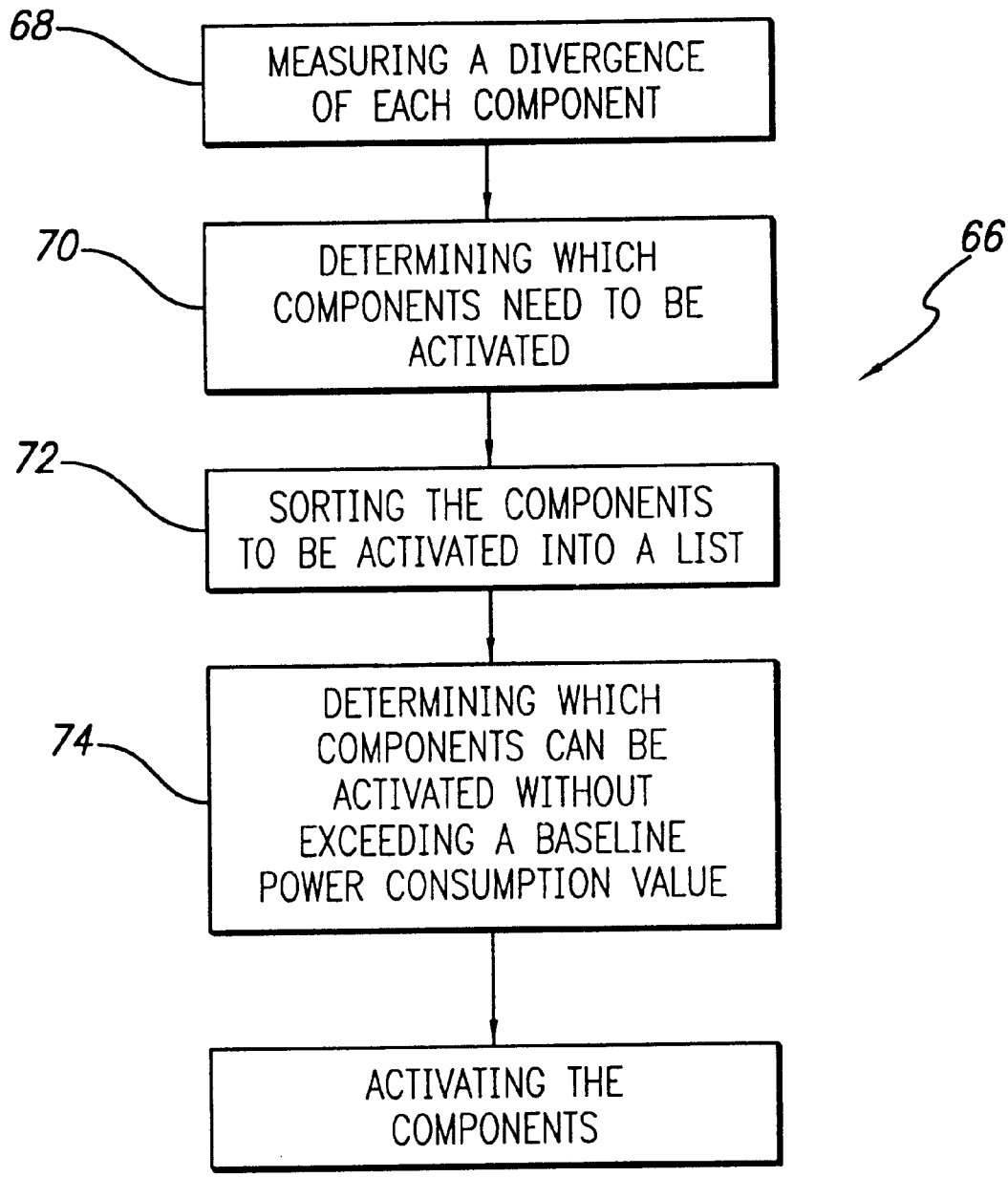
FIG. 4 is flow chart of the present invention method of power management for a SDM apparatus.

Referring now to FIG. 4 the present invention power management method is shown in flow chart form generally by numeral 66. Initially, each power drawing component is measured to determine a divergence with an acceptable threshold effect as indicated by numeral 68. For example, a thermocouple mounted on the planarizer can measures the temperature of the planarizer and compares it to the acceptable is threshold or desired effect, which in TABLE 1 is 80° C. If the measured temperature is, for example, 37° C., the divergence is 43° C. and the planarizer is not yet heated to its operating temperature. In this case, the planarizer heater would be determined to be a component that needs to be activated, as indicated by the step identified by numeral 70 in FIG. 4. Once the divergence of all components have been measured and those components that need to be activated have been determined, they are then sorted into a list as identified by numeral 72. In the next step, identified by numeral 74, it is determined which of the components will be activated without exceeding the baseline power consumption value.

Preferably the list is a hierarchical list based on the need for a component to be activated, the list being sorted from one end to the other according to the components having the greatest deviation from their threshold effect, wherein the components selected to be activated are picked according to their order from one end of the list to the other. Alternatively, the list can be a random list, if desired.

Appropriate software executes the above steps approximately 10 times a second. When the SDM apparatus is initially turned on, the power management system 66 executes the above steps until the apparatus achieves a steady state condition wherein the apparatus is ready to begin printing layers of three-dimensional objects. Generally, this steady state condition occurs when all of the power drawing components achieve their desired effect for the apparatus which occurs when substantially all of the components do not need to be activated. However, the components will be activated from time to time, as needed, in order to maintain the steady state condition of the apparatus. Thus, the power management software continues to monitor and execute the above steps on a continuous basis as three-dimensional objects are formed.

However, once the steady state condition is achieved, SDM apparatus starts to printing layers of three-dimensional objects and utilizes the flash exposure system to cure the material dispensed in the layers. The flash exposure system is activated for a desired period of time of about one second for each flash, as discussed in greater detail in U.S. patent application Ser. No. 10/140,426. Since the flash exposure system draws a substantial amount of power when activated, the power management system de-activates all other power drawing components under its control so that the baseline power consumption value of about 1250VA is not exceeded. This is achievable since the flash exposure system is only activated for a brief period of time (about 1 second) and remains de-activated approximately about 5 to about 10 seconds before being activated again.

Advantageously, the present invention power management system makes the SDM apparatus suitable for use with conventional power sources found in most all office environments throughout the world without the need for a transformer or power storage device.

All patents and other publications cited herein are incorporated by reference in their entirety. What has been described are preferred embodiments in which modifications and changes may be made without departing from the spirit and scope of the accompanying claims.

What is claimed is:

1. A method of power management for a selective deposition modeling apparatus, the apparatus having a plurality of power drawing components, each component having an activation power rating wherein the accumulative total of all the power ratings of the components exceeds a baseline power consumption value of the apparatus and one of the components is a high drawing component that draws a substantial amount of power when activated; the method comprising:

a) measuring a divergence from a desired effect to be achieved in the apparatus by each component;
   b) determining which components need to be activated based on a comparison of the measured divergence and an acceptable threshold effect for each component;
   c) sorting the components that need to be activated into a list;
   d) determining from the list a number of the power consuming components that can be activated without exceeding the baseline power consumption value;
   e) activating the components determined from step d)
   f) repeating steps a)-e) a plurality of times until the apparatus achieves a steady state condition wherein the apparatus may begin printing layers of a three-dimensional object;

g) printing a layer of the three-dimensional object;

h) continuing to repeat steps a)-e) to maintain the apparatus in a steady state condition; and i) activating the high power drawing component for a desired period of time while deactivating all other components so that the baseline power consumption value is not exceeded.

2. The method of claim 1 wherein the list is a random list where the components determined in step d) being selected in order starting from one end of the list.

3. The method of claim 1 wherein the list is a hierarchical list based on need, the list being sorted from one end to the other according to the components having the greatest deviation from their threshold effect, the components determined in step d) being selected in order from one end of the list to the other.

4. The method of claim 1 wherein one of the power drawing components is a high power drawing component that draws a substantial amount of power when activated, the method further comprising the steps of:

f) repeating steps a)–e) a plurality of times until the apparatus achieves a steady state condition wherein the apparatus may begin printing layers of a three-dimensional object;

g) printing a layer of the three-dimensional object;

h) continuing to repeat steps a)–e) to maintain the apparatus in the steady state condition;

i) activating the high power drawing component for a desired period of time while de-activating all other components so that the baseline power consumption value is not exceeded.

5. The method of claim 1 further comprising the steps of:

j) repeating steps g)–i) until all the layers of the three-dimensional object have been formed.

6. The method of claim 1 wherein the at least one high power drawing component is a flash exposure system and all the other components are heaters.

7. The method of claim 1 wherein the baseline power consumption value is about 1250 VA at a nominal root-mean-square voltage of about 100 V, the method further comprising the steps of:

determining the input line voltage, the input line voltage being between about 90V AC to about 264V AC;

cyclically stealing the line voltage delivered to each component so that each component receives a standard average apparent power (VA) when activated regardless of the input line voltage.

8. The method of claim 7 wherein the line voltage determined in about 100V AC, about 115V AC, or about 230V AC.

9. The method of claim 7 further comprising the step of:

staggering the cyclically stolen line voltage of each component in order to maintain a uniform power draw by the apparatus.

10. The method of claim 7 wherein the apparatus does not draw more than about 15 A of current when in operation.

11. A selective deposition modeling apparatus for forming a three-dimensional object from a curable material in a build environment, the apparatus receiving data corresponding to layers of the three-dimensional object, the apparatus comprising:

a support means affixed to the apparatus for supporting the three-dimensional object in the build environment;

a dispensing means affixed to the apparatus and in communication with the support means for dispensing the curable material in the build environment according to the computer data to form the layers of the three-dimensional object;

a flash exposure means affixed to the apparatus for curing the dispensed material, the flash exposure means in communication with the support means;

a plurality of power drawing components, each component having an activation power rating wherein the accumulative total of all the power ratings exceeds a baseline power consumption value of the apparatus;

a power management system that maintains the amount of power consumed by the plurality of power drawing components below a baseline power consumption value, the power management system adapted to:

a) measure the divergence from a desired effect to be achieved in the apparatus by each component;

b) determine which components need to be activated based on a comparison of the measured divergence and an acceptable threshold effect for each component;

c) sort the components that need to be activated into a list;

d) determine from the list the number of power consuming components that can be activated without exceeding the baseline power consumption value; and e) activate the components determined in step d).

* * * * *

UNITED STATES PATENT AND TRADEMARK OFFICE
CERTIFICATE OF CORRECTION

PATENT NO. : 6,711,451 B2
DATED : March 23, 2004
INVENTOR(S) : Mark Hastert and Arvind Chari It is certified that error appears in the above-identified patent and that said Letters Patent is hereby corrected as shown below:

Column 7,
Line 52, should read -- able threshold or desires effect, which i n TABLE 1 is 80 degrees. --

Column 9,
Claim 4 should be deleted.

Signed and Sealed this

Sixth Day of July, 2004

JON W. DUDAS
*Acting Director of the United States Patent and Trademark Office*